Patented Jan. 25, 1949

2,460,191

UNITED STATES PATENT OFFICE 2,460,191

PROCESS FOR PREPARING ESTERS OF ORGANIC CARBOXYLIC ACIDS

Richard F. Phillips, Westfield, N. J., assignor to Merck & Co., Inc., Rahway, N. J., a corporation of New Jersey No Drawing. Application July 13, 1946, Serial No. 683,429

4 Claims. (Cl. 260—482)

This invention relates to the preparation of esters of organic carboxylic acids. More particularly, it is concerned with the preparation of esters of N-acylamino acids, which are useful in the synthesis of penicillin and of compounds possessing penicillin-like activity.

Regarded in certain of its broader aspects, the process in accordance with the present invention comprises reacting an organic carboxylic acid, such as N-acylamino acids with an alkyl sulfite in the presence of the corresponding alcohol and an acidic catalyst.

N-acyl glycines, which are useful as starting materials in accordance with my invention can be prepared by reacting glycine with an acyl chloride. The general process and the compounds thereby secured are disclosed and claimed in a copending application to my colleagues, Rogers, Koniuszy and Folkers, Serial No. 636,255, filed December 20, 1945 which is now abandoned.

In accordance with the present invention, N-acyl glycine is refluxed with approximately a molar equivalent of an alkyl sulfite in the presence of the corresponding alcohol and an acid catalyst. The amount of alcohol and acid necessary for the reaction is small. Upon completion of the reaction, the excess acid is neutralized with potassium carbonate. Since only a small quantity of acid is used the reaction mixture is rapidly neutralized. The mixture is then filtered and the N-acyl glycine ester recovered from the filtrate by distillation. N-acyl glycines prepared in this manner are obtained in high yields. Alkyl sulfites such as dimethyl sulfite or any of the higher homologs, ethyl, propyl, etc., can be employed in this reaction.

The following examples set forth a method of carrying out the present invention, but it is to be understood that these examples are given by way of illustration and not of limitation.

Example 1

N-n-butyrylglycine was prepared by reacting butyryl chloride with glycine. A mixture of 14.5 g. of N-n-butyrylglycine (0.1 mole), 12 g. of dimethyl sulfite (0.11 mole), 11 g. of methanol and 0.5 cc. of a 20% solution of hydrogen chloride in methanol was heated at reflux temperature for 3 hours. The mixture was cooled and the excess acid neutralized with dry potassium carbonate until a drop of the solution failed to produce a blue color with Congo red paper. The mixture was filtered and the filtrate distilled under reduced pressure. 14.7 g. (92% of theory) of N-n-butyrylglycine methyl ester, which distilled sharply at 118° C. and 0.9 mm. pressure, was obtained.

Example 2 n-Caproylglycine was prepared by the reaction of 374 g. of caproyl chloride with 228 g. of glycine. The crude n-caproylglycine obtained was treated with a mixture of 200 cc. of methanol, 169 g. of dimethyl sulfite and 7 cc. of a 20% hydrochloric acid solution in methanol at reflux temperature for 3 hours. The reaction mixture was cooled and the excess acid neutralized with dry potassium carbonate until a drop of the solution fails to produce a blue color with Congo red paper. N-n-caproylglycine methyl ester, with a boiling point of 127 to 130° C. at 0.25 mm. pressure, was obtained in a 86% yield (based on caproylchloride).

Example 3

Iso-valerylglycine was prepared by reacting 330 g. of glycine with 484 g. of iso-valerylchloride. A mixture of the iso-valerylglycine obtained, 440 cc. of methanol, 390 cc. of dimethylsulfite, and 20 cc. of a 20% hydrochloric acid solution in methanol was heated at reflux temperature for 4 hours. The reaction mixture was cooled and the excess acid neutralized with dry potassium carbonate until a drop of the solutions failed to produce a blue color with Congo red paper. N-iso-valerylglycine methyl ester, with a boiling point of 108–110° C. at 0.65 mm. pressure was obtained in a 79% yield (based on iso-valerylchloride).

Modifications may be made in carrying out the present invention without departing from the spirit and scope thereof and the invention is to be limited only by the appended claims.

I claim:

1. The process that comprises reacting an N-acylamino acid with approximately a molar equivalent of a dialkyl sulfite in the presence of the corresponding alcohol and an acidic catalyst to form an N-acylamino ester.

2. The process that comprises reacting N-n-butyrylglycine with approximately a molar equivalent of dimethyl sulfite in the presence of methanol and an acidic catalyst to form N-n-butyrylglycine methyl ester.

3. The process that comprises reacting N-iso-valerylglycine with approximately a molar equivalent of dimethyl sulfite in the presence of methanol and an acidic catalyst to form N-iso-valerylglycine methyl ester.

4. The process that comprises reacting N-n-caproylglycine with approximately a molar equivalent of dimethyl sulfite in the presence of methanol and an acidic catalyst to form N-n-caproylglycine methyl ester.

RICHARD F. PHILLIPS.

REFERENCES CITED

The following references are of record in the file of this patent:

UNITED STATES PATENTS

| Number | Name | Date |
|---|---|---|
| 1,365,050 | Ellis | Jan. 11, 1921 |
| 2,183,357 | Ritchie et al. | Dec. 12, 1939 |

OTHER REFERENCES

Bondi et al., "Biochem. Z.," vol. 23, (1910), pages 500, 501, 502 and 505.

Karrer et al., "Helv. Chim. Acta.," vol. 8, (1925), pages 208 and 209.

Levaillant, "Comptes Rendus," vol. 190, (1930), pages 54–57.

Voss et al. (I), "Liebigs Annallen," 485 (1935), pages 265–283.

Voss et al. (II), Ber. Deut. Chem., vol. 70, (1937), pages 388–392.

Lassar-Cohn, "Arbeitsmethoden fur Organisch-chemische Laboratorien," 4th ed., special part page 275.